United States Patent
Polyudov (10) Patent No.: US 8,078,637 B1
(45) Date of Patent: Dec. 13, 2011

(54) MEMORY EFFICIENT PEIM-TO-PEIM INTERFACE DATABASE

(75) Inventor: Feliks Polyudov, Lilburn, GA (US)

(73) Assignee: American Megatrends, Inc., Norcross, GA (US)

(*) Notice: Subject to any disclaimer, the term of this patent is extended or adjusted under 35 U.S.C. 154(b) by 621 days.

(21) Appl. No.: 11/495,218

(22) Filed: Jul. 28, 2006

(51) Int. Cl.
| G06F 7/00 | (2006.01) |
| G06F 17/30 | (2006.01) |
| G06F 12/00 | (2006.01) |
| G06F 15/16 | (2006.01) |
| G06F 9/00 | (2006.01) |
| G06F 15/177 | (2006.01) |

(52) U.S. Cl. .................. 707/791; 707/899; 713/2

(58) Field of Classification Search ........... 707/999.102, 707/790, 791, 800, 801
See application file for complete search history.

(56) References Cited

U.S. PATENT DOCUMENTS

| 5,671,406 | A * | 9/1997 | Lubbers et al. ........... 707/696 |
| 6,499,032 | B1 * | 12/2002 | Tikkanen et al. ........... 707/693 |
| 7,134,007 | B2 * | 11/2006 | Zimmer et al. ........... 713/1 |
| 7,143,275 | B2 * | 11/2006 | Cepulis et al. ........... 713/1 |
| 7,237,102 | B2 * | 6/2007 | Rothman ........... 713/1 |
| 2004/0064448 | A1 * | 4/2004 | Wang ........... 707/5 |
| 2004/0064457 | A1 * | 4/2004 | Zimmer et al. ........... 707/100 |
| 2004/0088531 | A1 * | 5/2004 | Rothman ........... 713/1 |
| 2004/0267708 | A1 * | 12/2004 | Rothman et al. ........... 707/3 |
| 2005/0015430 | A1 * | 1/2005 | Rothman et al. ........... 709/201 |
| 2005/0108511 | A1 * | 5/2005 | Zimmer et al. ........... 713/1 |
| 2005/0108514 | A1 * | 5/2005 | Rothman et al. ........... 713/2 |
| 2005/0149924 | A1 * | 7/2005 | Komarla et al. ........... 717/176 |
| 2005/0198487 | A1 * | 9/2005 | Zimmer et al. ........... 713/2 |
| 2005/0204357 | A1 * | 9/2005 | Garg et al. ........... 718/1 |
| 2005/0210222 | A1 * | 9/2005 | Liu et al. ........... 712/220 |
| 2006/0294355 | A1 * | 12/2006 | Zimmer et al. ........... 713/2 |
| 2007/0055856 | A1 * | 3/2007 | Zimmer et al. ........... 713/2 |
| 2007/0283138 | A1 * | 12/2007 | Miga et al. ........... 713/2 |

OTHER PUBLICATIONS

Specification entitled, Intel Platform Innovation Framework for EFI Pre-EFI Initialization Core Interface Specification (PEI CIS), dated Nov. 11, 2004, pp. 1-207, Version 0.91.

* cited by examiner

Primary Examiner — Charles Kim
Assistant Examiner — Jeremy Engelskirchen
(74) Attorney, Agent, or Firm — Hope Baldauff Hartman, LLC (57) ABSTRACT

An efficient PEIM-to-PEIM interface ("PPI") database for storing data identifying one or more PPIs. The PPI database includes a linked list having one or more linked arrays of elements. The elements in each array store data identifying a PPI. Each array in the linked list of arrays may also include an element reserved for storing data identifying the last element in the array. Each array in the linked list of arrays may also include an element reserved for storing a pointer to a next array in the linked list of arrays. When the last array in the linked list of arrays becomes full, a new array is created, and a pointer to the new array is stored in the last array.

3 Claims, 8 Drawing Sheets

MEMORY EFFICIENT PEIM-TO-PEIM INTERFACE DATABASE

BACKGROUND

In many computing systems, low-level instruction code is used as an intermediary between the hardware components of the computing system and the operating software and other high-level software executing on the computing system. In some computer systems, this low-level instruction code is known as the Basic Input and Output System ("BIOS"). The BIOS provides a set of software routines that allow high-level software to interact with the hardware components of the computing system using standard calls.

Because of limitations of the BIOS in many PC-compatible computers, a new firmware architecture for booting the computer and for intermediating the communication between the operating system and the hardware has been created. The new architecture is defined via a set of specifications. One of the specifications is called the Extensible Firmware Interface ("EFI") Specification and is available from INTEL CORPORATION. The original EFI Specification from INTEL CORPORATION is also being extended by the Unified Extensible Firmware Interface Forum ("UEFI").

The EFI Specification describes an interface between the operating system and the system firmware. In particular, the Specification defines the interface that platform firmware must implement and the interface that the operating system may use in booting. How the firmware implements the interface is left up to the manufacturer of the firmware. The EFI Specification provides mechanisms for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

Additional details regarding the EFI and UEFI firmware architecture are defined by the group of specifications called INTEL Platform Innovation Framework for EFI ("the Framework"), which are available from INTEL CORPORATION. Unlike the EFI Specification, which focuses only on programmatic interfaces for the interactions between the operating system and system firmware, the Framework defines programmatic interfaces for performing the full range of operations that are required to initialize the platform from power on through transfer of control to the operating system.

The Framework defines two major execution phases: Pre-EFI Initialization ("PEI") and the Driver Execution Environment ("DXE"). PEI includes the minimum amount of program code needed to perform basic platform initialization and is executed from non-volatile memory. When PEI has completed its initialization, including the initialization of main memory, control passes to the DXE, which performs higher-level platform initialization and diagnostic functions. Because PEI is executed before memory initialization, very limited memory resources are available during this phase. No global variables or procedures for de-allocating memory are available during PEI.

Pre-EFI Initialization modules ("PEIMs") are specialized drivers that are executed during PEI. PEIMs are generally utilized to perform the actual hardware initialization that takes place during PEI. Communication between PEIMs is very difficult during the limited memory PEI phase. In order to enable such communication, the PEI phase provides mechanisms for PEIMs to locate and invoke interfaces from other PEIMs. This mechanism is called a PEIM-to-PEIM Interface ("PPI"). The PEI phase provides functions for installing, reinstalling, and locating PPIs. The PEI phase also provides a function through which a PEIM can register to receive a notification when a specified PPI is installed.

In order to implement functions for installing, reinstalling, and locating PPIs, PEI should maintain a PPI database for storing data identifying the installed PPIs. The Framework does not, however, define how the PPI database should be implemented. Implementation of a database in an extremely memory-limited environment where code is executed from non-volatile memory is very difficult. In particular, the data structures typically utilized for database implementation are unsuitable for use in a memory limited environment, such as the PEI. For instance, linked lists require a relatively large amount of space for storing the pointers that link the nodes in the list. Arrays also have their own drawbacks in a memory-limited environment. In particular, arrays are allocated in advance and have a fixed size. As a result, the allocated but unused portion of an array is wasted. Additionally, as utilization of an array grows, previous solutions typically allocate memory for a larger array, copy the data from the current array to the new array, and de-allocate the memory for the old array. However, in PEI there is no functionality provided for de-allocating memory. Accordingly, the use of an array in this manner is not possible in PEI.

It is with respect to these considerations and others that the various embodiments of the invention have been made.

SUMMARY

The above and other problems are solved by methods, apparatus, and computer-readable media for providing a memory efficient PPI database. As described herein, a memory efficient PPI database is provided that reduces wasted memory due to the overhead of a linked list and allocated but unused array elements, while at the same time preserving the ability to allocate additional storage space for the PPI database without de-allocating memory.

According to one aspect of the disclosure presented herein, a method is provided for storing data identifying a PPI in a Pre-EFI Initialization environment. According to the method, a PPI database is created for storing the data identifying the PPI. The PPI database includes a linked list of arrays. The elements in each array are operative to store data identifying a PPI. For instance, the data identifying the PPI may comprise a pointer to a PPI descriptor stored in a PEIM. The PPI descriptor is an array. Every element of the PPI descriptor includes description of a single PPI. The PPI description includes a pointer to a globally unique identifier ("GUID") and a pointer to an interface provided by a corresponding PEIM. The PPI description may also include one or more flags for determining whether the PPI description is the last one in the PPI descriptor. The flags may also indicate whether the PPI description identifies a new PPI to be installed or a request for notification that should be provided when the identified PPI is installed or reinstalled.

According to other aspects of the method, each array in the linked list of arrays may further include an element reserved for storing data indicating the end of the array. Each array in the linked list of arrays may also include an element reserved for storing a pointer to a next array in the linked list of arrays. When the last array in the linked list of arrays becomes full, a new array is created and a pointer to the new array is stored in the last array. In this manner, space can be allocated and used as needed for the PPI database without the overhead of a traditional linked list.

According to another method presented herein, a PPI database is created that includes a first array having one or more elements for storing data identifying a PPI. Each array also has an element reserved for storing an end of the array indicator. Each array also has an element reserved for storing a next array pointer. The next array pointer is a pointer to a next array in the linked list of arrays. The next array pointer is also utilized as an end indicator. A special next pointer array value is used to indicate that an array is the last array in a linked list of arrays.

When a request is received to add a new PPI to the PPI database, a determination is made as to whether the first array is full. If the first array is not full, data identifying the new PPI is stored in the first array. If the first array is full, a second array is created in the PPI database. A pointer to the second array is stored in the next array pointer of the first array. The data identifying the new PPI is also stored in the second array. As each array becomes full, additional arrays are added to the linked list of arrays in a similar manner.

According to other aspects of the disclosure provided herein, a computer-readable medium is provided that has a data structure stored thereon for use in storing data identifying one or more PPIs in a Pre-EFI Initialization environment. According to embodiments, the data structure includes a first array having one or more elements for storing data identifying a PPI. The first array also includes an element for storing an end of the array indicator. The first array may also include a next array element for storing a pointer to a next array in the linked list that may also indicate that the first array is the last array in a linked list of arrays.

According to aspects, the data structure may further include a second array also having elements for storing data identifying a PPI, an element for storing an end indicator, and a next array element. When the second array is added to the linked list of arrays, the next array element of the first array is configured to store a pointer to the second array. The next array element of the second array is also configured to indicate that the second array is the last array in the linked list of arrays.

Aspects of the disclosure provided herein may also be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages will be apparent from a reading of the following detailed description and a review of the associated drawings.

DETAILED DESCRIPTION

Embodiments of the disclosure presented herein provide methods, systems, apparatuses, and computer-readable media for providing a PPI database. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

Figure 1:
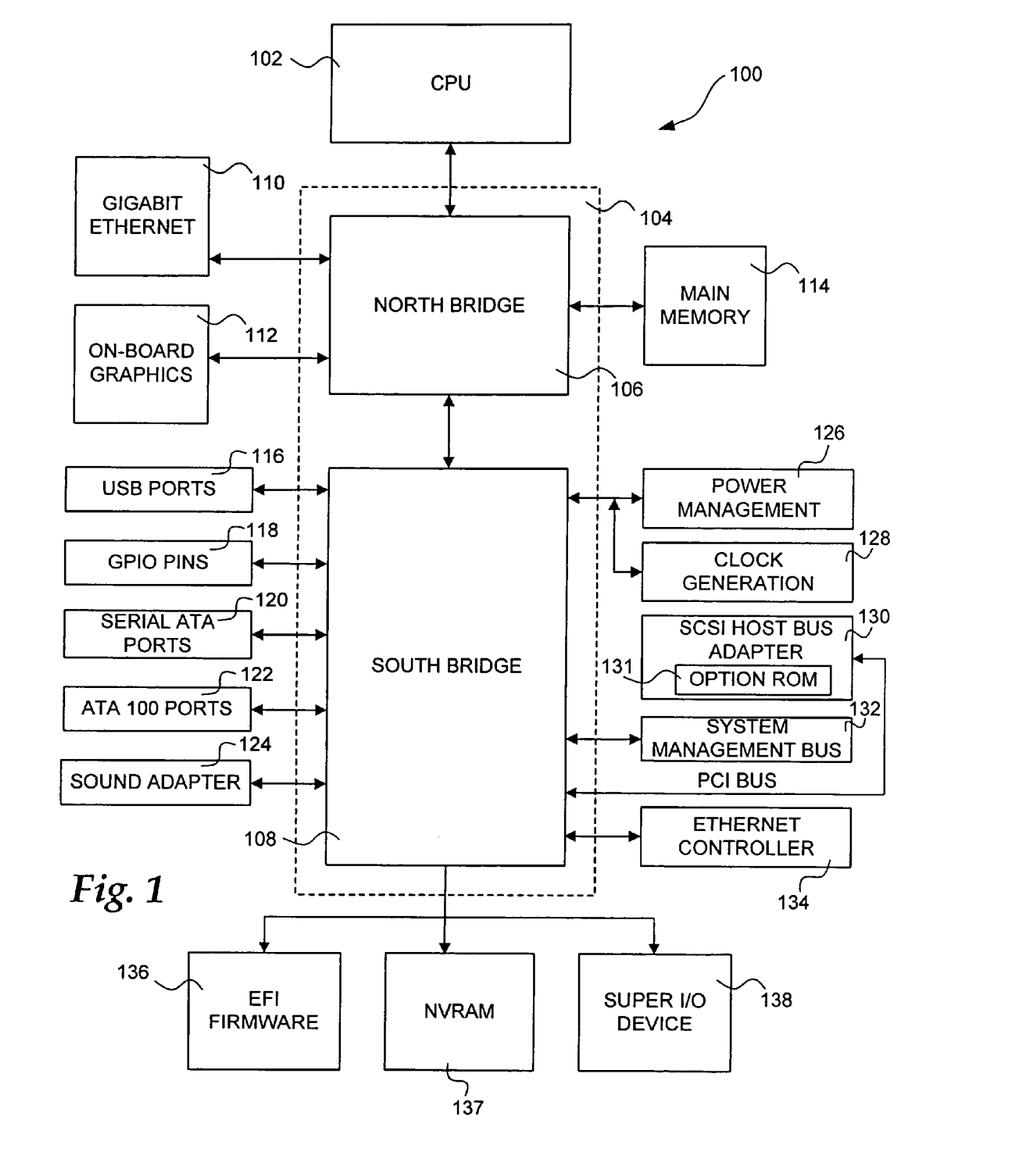
FIG. 1 is a computer architecture diagram that illustrates various components of a computer that provides an illustrative operating environment for the implementations presented herein.

FIG. 1 and the following discussion are intended to provide a brief, general description of a suitable computing environment in which the invention may be implemented. While the invention will be described in the general context of program modules that execute in conjunction with the execution of a computer firmware, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments discussed herein will be described. It should be appreciated that although the embodiments described herein are discussed in the context of a conventional desktop or server computer, the embodiments may be utilized with virtually any type of computing device. FIG. 1 shows an illustrative computer architecture for a computer 100 that is operative to provide an EFI firmware that provides a PEI phase and that maintains a PPI database during the PEI phase.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to a random access memory ("RAM") used as the main memory 114 in the computer 100 and, possibly, to an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections that may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BIOS boot system-compliant SCSI host bus adapter 130. The host bust adapter 130 may include an option ROM 131. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("SATA") adapter for providing one or more SATA ports 120 and an ATA100 adapter for providing one or more ATA100 ports 122. The SATA ports 120 and the ATA100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the south bridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. The EFI firmware 136 comprises a firmware that is compatible with the EFI Specification. Additional details regarding the operation of the EFI firmware 136 are provided below with respect to FIGS. 2-4. The LPC interface may also be utilized to connect a NVRAM 137 to the computer 100. The NVRAM 137 may be utilized by the firmware 136 to store configuration data for the computer 100. The configuration data for the computer 100 may also be stored on the same NVRAM 137 as the firmware 136.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
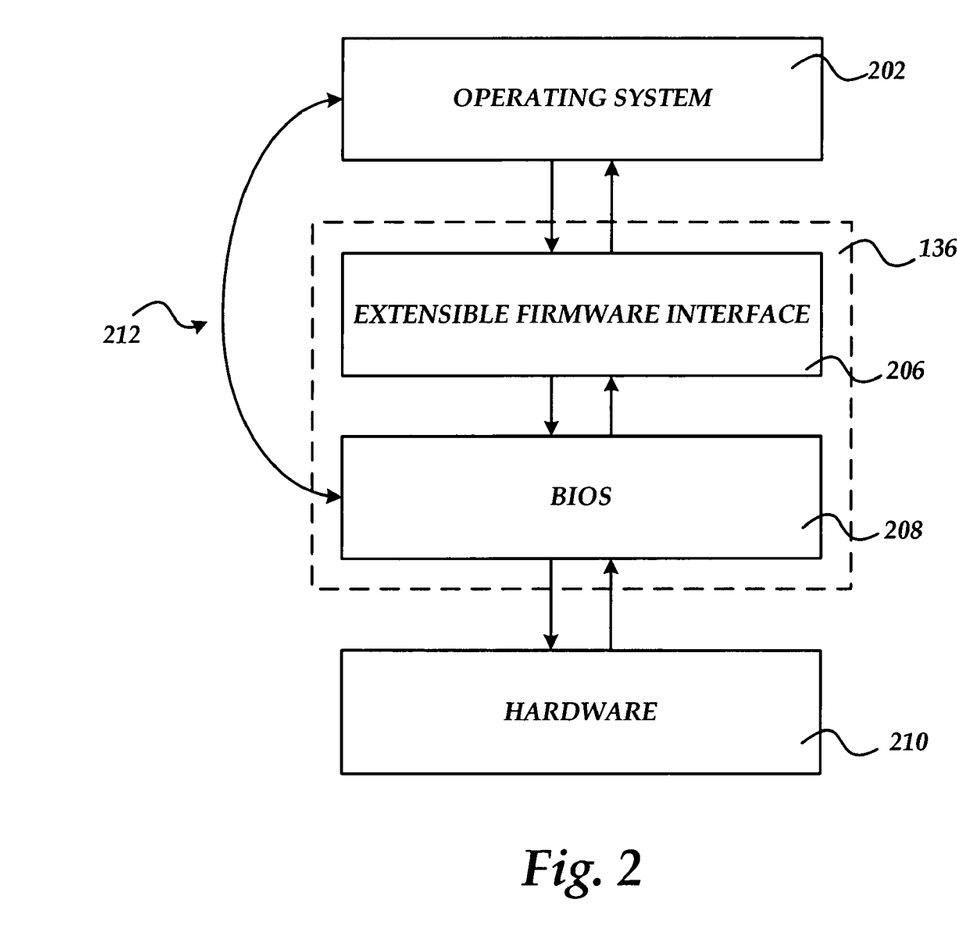
FIGS. 2 and 3 are software architecture diagrams that illustrate aspects of an EFI environment utilized by the embodiments presented herein.

Referring now to FIG. 2, additional details regarding the operation of the EFI firmware 136 of the computer 100 will be described. As described above, the firmware 136 comprises a firmware compatible with the EFI Specification from INTEL CORPORATION or from the UEFI FORUM. The EFI Specification describes an interface between the operating system 202 and the system firmware 136. The EFI Specification defines the interface that platform firmware must implement, and the interface that the operating system 202 may use in booting. How the firmware 136 implements the interface is left up to the manufacturer of the firmware. The intent of the Specification is to define a way for the operating system 202 and firmware 136 to communicate only information necessary to support the operating system boot process. This is accomplished through a formal and complete abstract Specification of the software-visible interface presented to the operating system by the platform and the firmware.

According to one implementation of EFI on INTEL CORPORATION IA-32 platforms, both the EFI 206 and a BIOS 208 may be presented in the firmware 136. This allows the computer 100 to support both firmware interfaces. In order to provide this functionality, an interface 212 may be provided for use by legacy operating systems and applications. Additional details regarding the architecture and operation of the EFI 204 are provided below with respect to FIGS. 3-4. Additional details regarding the operation and architecture of EFI can be found in the EFI Specification and in the Framework, both of which are available from INTEL CORPORATION and expressly incorporated herein by reference.

Figure 3:
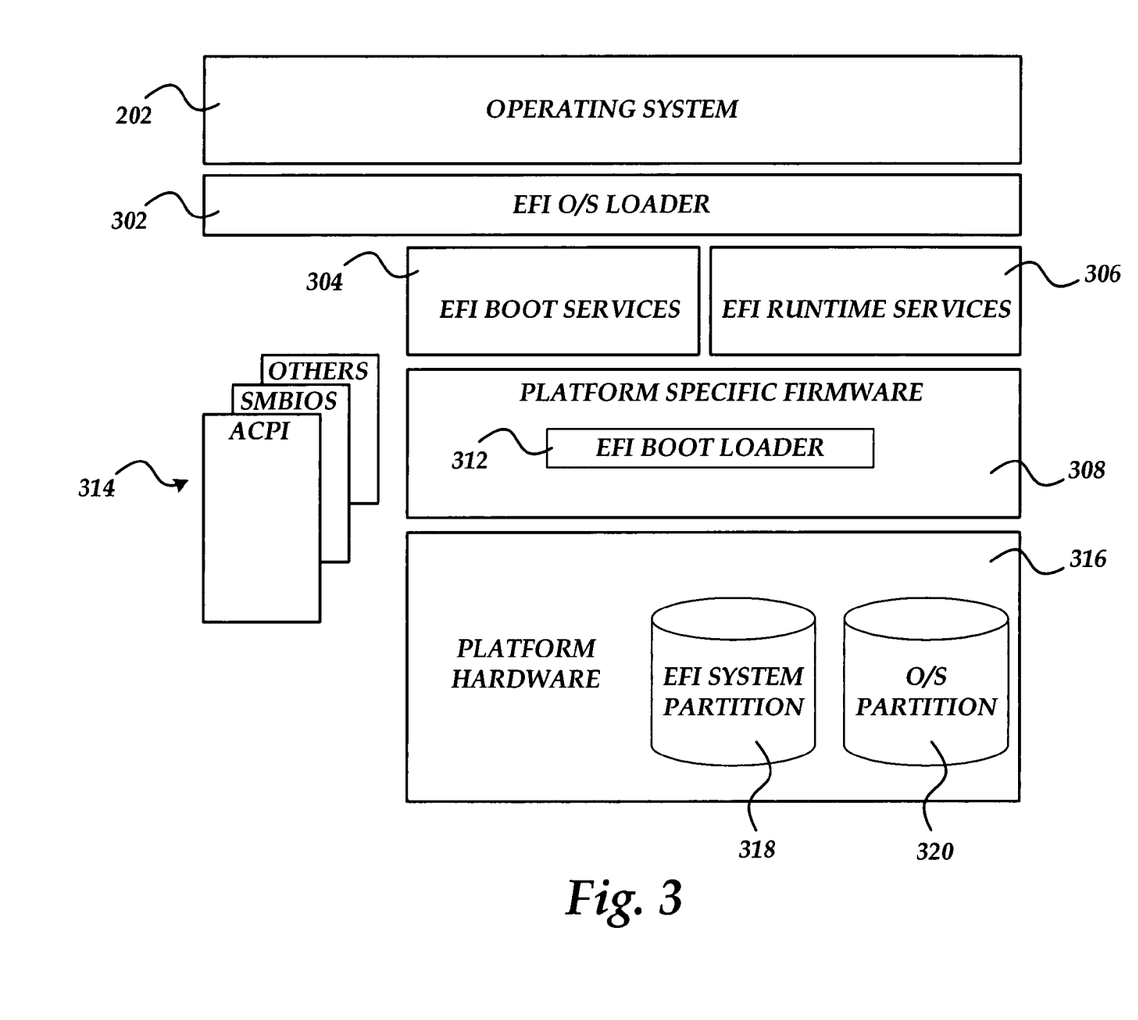

Turning now to FIG. 3, additional details regarding an EFI Specification-compliant system utilized to provide an operating environment for the various embodiments presented herein will be described. As shown in FIG. 3, the system includes platform hardware 316 and an operating system 202. The platform firmware 308 may retrieve an OS image from the EFI system partition 318 using an EFI O/S loader 302. The EFI system partition 318 may be an architecturally shareable system partition. As such, the EFI system partition 318 defines a partition and file system that are designed to allow safe sharing of mass storage between multiple vendors. An O/S partition 320 may also be utilized.

Once started, the EFI O/S loader 302 continues to boot the complete operating system 202. In doing so, the EFI O/S loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

EFI boot services 304 provides interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order.

Figure 4:
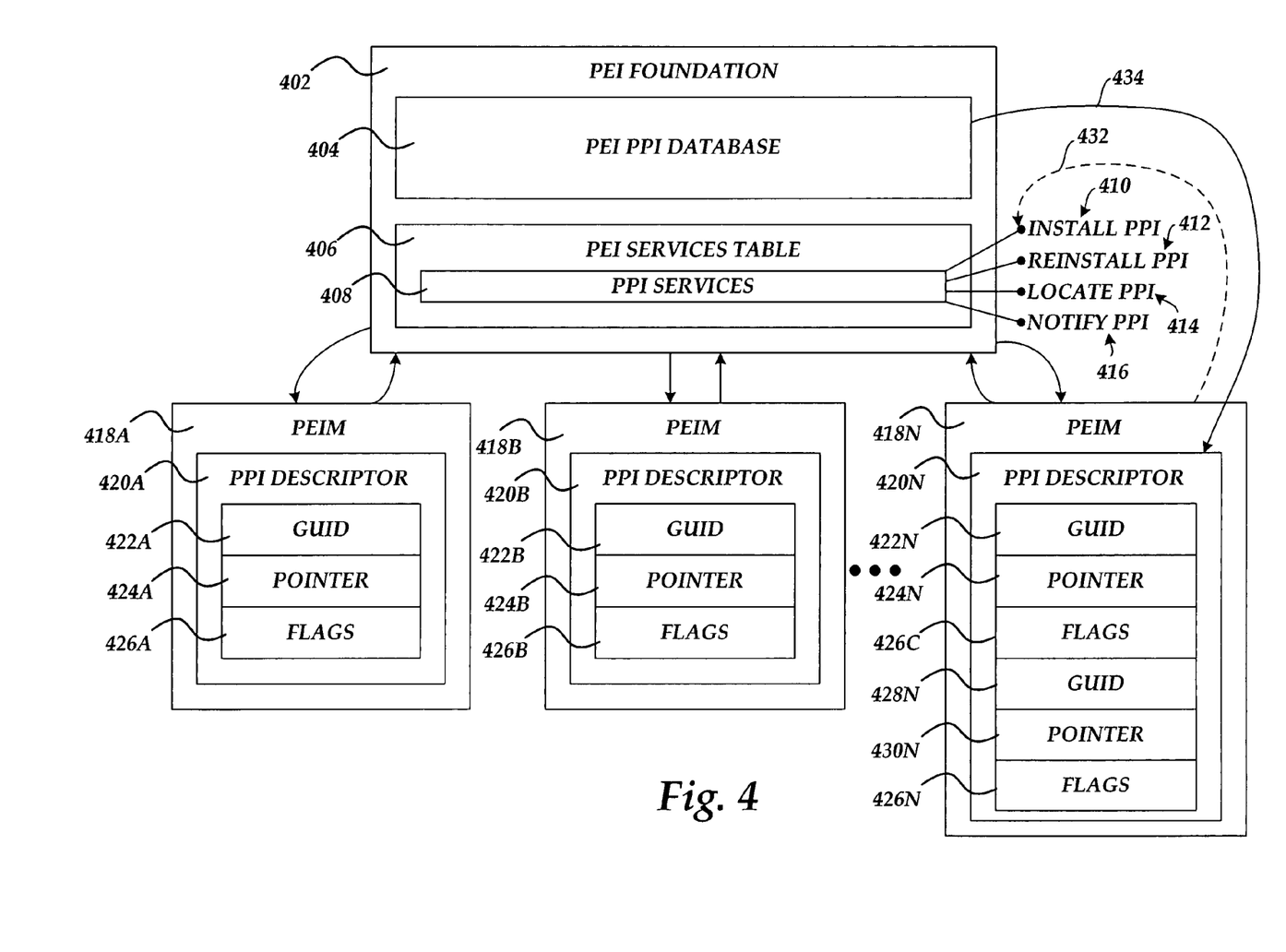
FIG. 4 is a software architecture diagram illustrating aspects of a PEI that provides an operating environment for the embodiments described herein.

Referring now to FIG. 4, details regarding a PEI phase of execution will be provided. As discussed briefly above, the Framework is executed in two major phases: PEI and the DXE. PEI includes the minimum amount of program code needed to perform basic platform initialization and is executed from non-volatile memory. When PEI has completed its initialization, including the initialization of main memory, control passes to the DXE, which performs higher-level platform initialization and diagnostic functions. Because PEI is executed before memory initialization, very limited memory resources are available during this phase. No global variables or procedures for de-allocating memory are available during PEI.

FIG. 4 illustrates aspects of an illustrative PEI phase of execution. In particular, the operation of the PEI is controlled by core code called the PEI foundation 402. One or more PEIMs 418A-418N may also be utilized by the PEI foundation 402. The PEIMs 418A-418N are specialized plug-ins that execute within the PEI in order to customize the PEI foundation 402 to the platform. The PEI foundation 402 provides functionality for locating, validating, and dispatching the PEIMs 418A-418N, facilitating communication between the PEIMs 418A-418N, and providing handoff data to the DXE phase.

The PEI foundation 402 establishes a system table named the PEI services table 406 that is visible to the PEIMs 418A-418N. The PEI services table 406 exposes a number of PEI services. A PEI service is a function, command, or other capability manifested by the PEI foundation 402. One class of PEI service is the PPI services 408.

The PPI services 408 manage PPIs to facilitate intermodule calls between PEIMs. A PPI is a mechanism utilized by the PEIMs 418A-418N to discover and communicate with one another. The PPI services 408 expose a service 410 for installing a PPI in the database 404, a service 412 for reinstalling a PPI in the database 404, a service 414 for locating a PPI that has been previously installed in the database 404, and a service 416 for registering to be notified when a PPI is installed or reinstalled in the database 404. More particularly, the service 410 installs an interface in the PEI PPI database 404 by GUID. In this manner, the interface is published so that other parties can discover and utilize the interface. The service 412 reinstalls an interface in the PEI PPI database 404 by GUID. This service can be used to replace a same-named interface in the PEI PPI database 404 with a different interface. The service 414 locates an interface in the PEI PPI database 404 by GUID. The service 416 registers request for a notification to be called back when a given interface is installed or reinstalled. Interfaces installed by the services 412 and 414 are tracked in a PEI PPI database 404 that is maintained in temporary RAM. It should be appreciated that although the Framework indicates that the PEI PPI database 404 should be provided during the PEI phase, the Framework does not provide any implementation details for the PEI PPI database.

As also shown in FIG. 4, each of the PEIMs 418A-418N is operative to expose a PPI descriptor 420A-420N, respectively. Each PPI descriptor includes a GUID/pointer pair. The GUID provides a unique identifier for the interface and the associated pointer provides the associated data structure and/or service set for the PPI. For instance, the PPI descriptor 420A includes the GUID 422A and the pointer 424A. A single PEIM may also expose multiple GUID/pointer pairs. For instance, as shown in FIG. 4, the PEIM 418N is exposing a GUID 422N and associated pointer 424N. The PEIM 418N is also exposing a GUID 428N and its associated pointer 430N. In this manner, a PEIM can expose more than one PPI. The flags 426N may be utilized to indicate whether a particular GUID/pointer pair is the last one for the PEIM. According to embodiments, the flags 426N may also be utilized to specify the type of the information referred to by the pointer. The pointer can refer to an interface or to the notification request.

The producer of a PPI publishes the available PPIs in its PEIM using the services 410 and 412 for installing and reinstalling the PPIs, respectively. For instance, in FIG. 4, the PEIM 418N has made a call 432 to the service 410 to install its PPI. Installation of the PPI causes a link 434 to be created in the database 404 to the installed PPI descriptor. The consumer of a PPI can then use the service 414 to discover the PPI of interest and to then consume the provided service. All PPIs are registered and located using these services.

Figure 5:
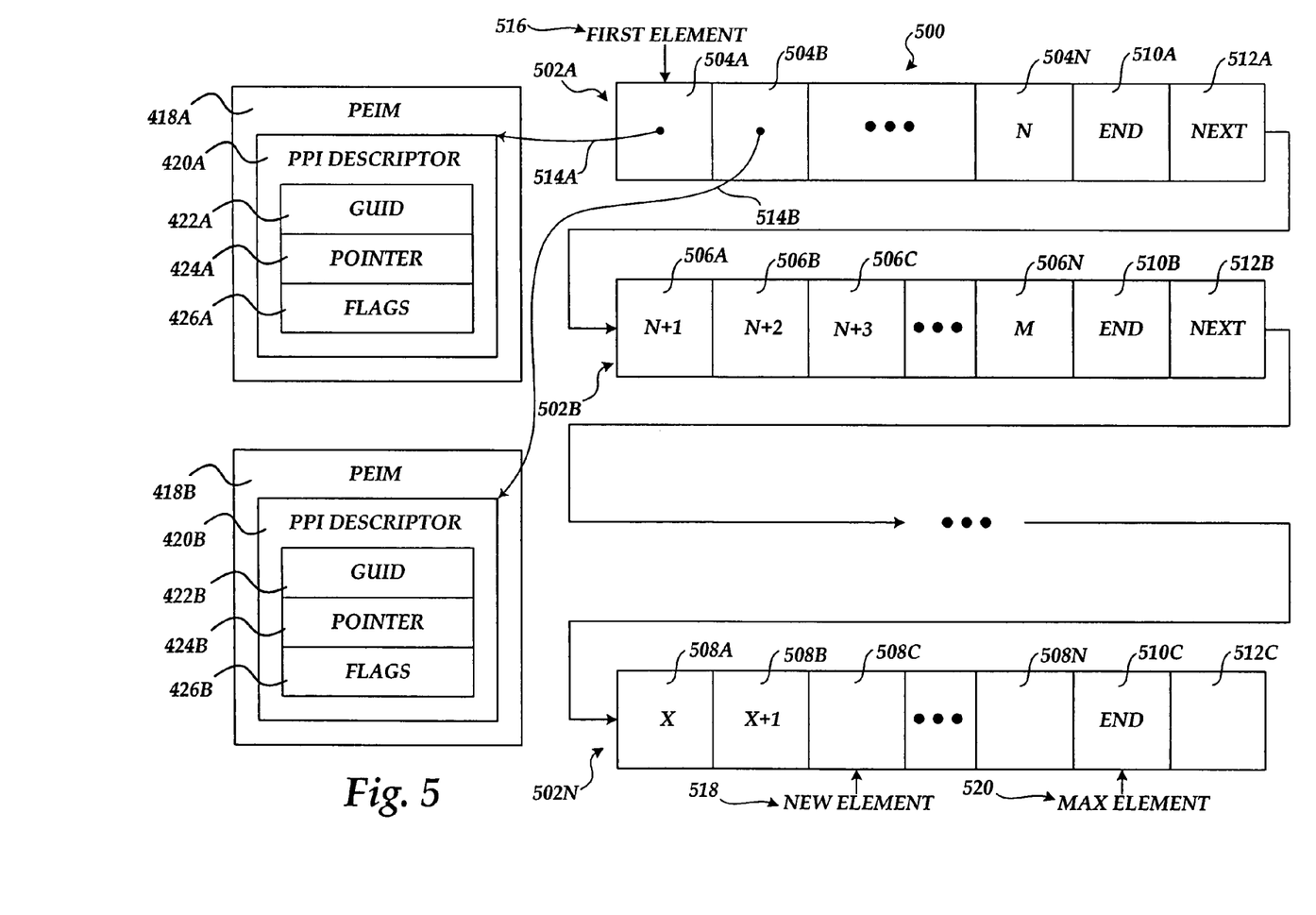
FIG. 5 is a data structure diagram illustrating aspects of a PPI database provided herein.

Turning now to FIG. 5, additional details regarding an implementation of a PEI PPI database 500 provided herein will be discussed. As mentioned above, the Framework indicates that PEI should maintain a PPI database for storing data identifying the installed PPIs. The Framework does not, however, define how the PPI database should be implemented.

FIG. 5 illustrates aspects of a PEI PPI database 500 provided herein that is suitable for use in a memory-limited environment, such as the PEI phase. In particular, the PEI PPI database 500 comprises a linked list of arrays 502A-502N. The arrays 502A-502N include elements that hold pointers to PPI descriptors that have been installed or reinstalled in the PEI PPI database 500. For instance, the array 502A includes a number of elements 504A-504N for storing pointers to PPI descriptors. The array 502B includes the elements 506A-506N and the array 502N includes the elements 508A-508N. In the example shown in FIG. 5, the element 504A includes a pointer 514A to the PPI descriptor 420A installed by the PEIM 418A. The element 504B includes a pointer 514B to the PPI descriptor 420B installed by the PEIM 418B.

As will be described in greater detail below, the arrays 502A-502N are allocated in memory on an as-needed basis. In particular, an array 502A is allocated on initialization. The array 502A may be allocated to have a minimal size, such as 8 or 16 pointers. Once all of the elements 504A-504N allocated for storing pointers to PPIs in the array 502A have been utilized, a new array 502B is allocated and linked to the array 502A. The linking between arrays is made using a pointer stored in an element reserved for such use. For instance, as shown in FIG. 5, the element 512A of the array 502A is reserved for storing a pointer to the next array in the linked list. Accordingly, the pointer stored in the element 512A creates a link from the array 502A to the array 502B. The last array in the linked list is indicated by storing a pre-defined value in the element 512 of the last array in the linked list.

Once a new array 502B has been created, pointers to newly installed PPIs are then stored in the array 502B. This process continues by repeating the allocation of memory for additional arrays as needed, and creating pointers from the linked list to the new arrays. In this manner, a linked list of arrays is created that includes pointers to all of the installed or re-installed PPIs. Additionally, little memory is utilized for overhead since there is only one pointer utilized per array, and there is little wasted memory since the size of the arrays is generally relatively small.

As also shown in FIG. 5, each of the arrays 502A-502N includes an element 510A-510C for storing an indication that the end of the array is reached. Additionally, several pointers are maintained to keep track of the various arrays. In particular, a first element pointer 516 is maintained that points to the first element of the first array 502A in the linked list. A new element pointer 518 is also maintained that signifies the location where pointers to new PPI descriptors should be inserted into the linked list. A maximum element pointer 520 is also maintained that indicates the last location in the linked list where a new PPI may be added. When the value of the new element pointer 518 is equivalent to the value of the maximum element pointer 520, a new array is added to the linked list. Additional details regarding this process are provided below with respect to FIGS. 6-8.

Figure 6:
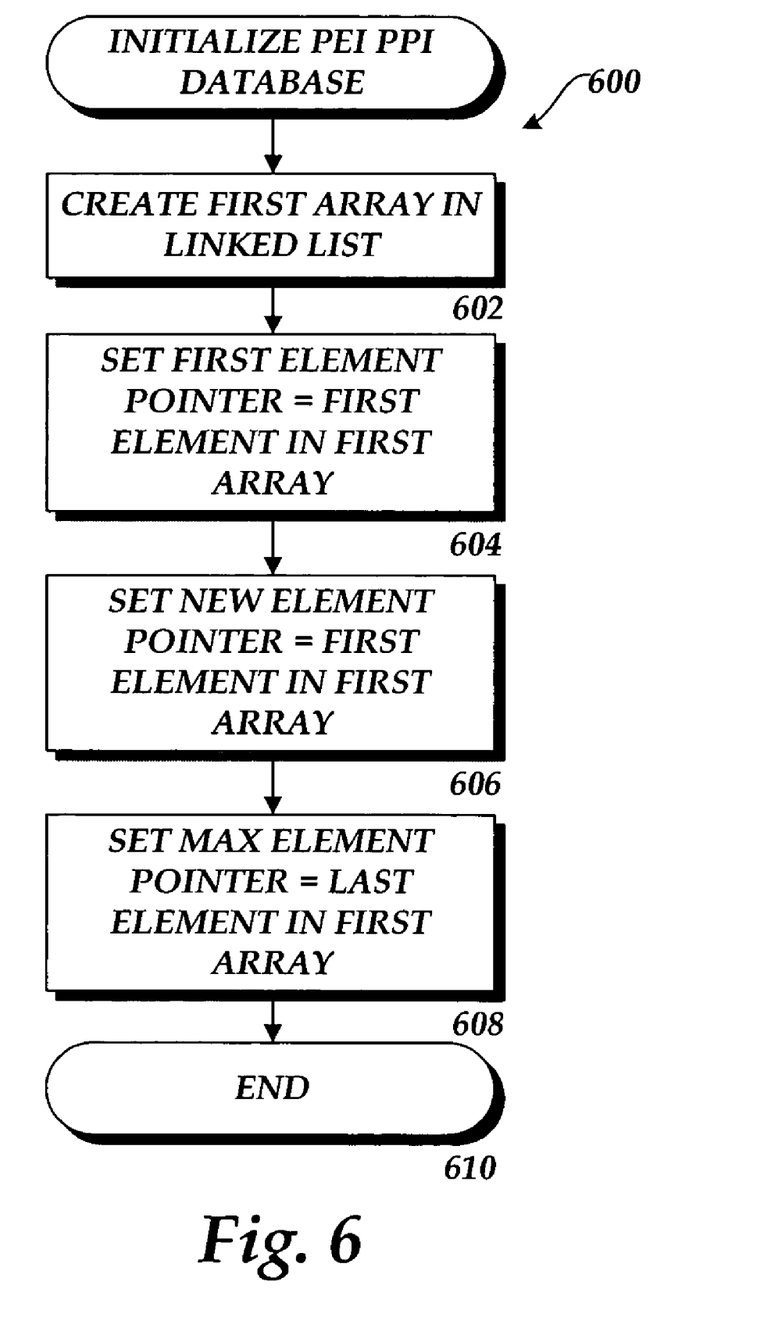
FIGS. 6-8 are flow diagrams illustrating processes provided herein for initializing a PPI database, adding a new PPI to the PPI database, and locating a PPI in the PPI database, respectively.

Referring now to FIG. 6, an illustrative routine 600 will be described in detail for initializing the PPI database 500 described above with respect to FIG. 5. The logical operations of the various embodiments described herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where the first array 502A is created in the linked list of arrays. As discussed above, the size of the array 502A is generally a fairly small size, such as 8 or 16 pointers. Once the array 502A has been initialized, the routine 600 continues to operation 602, where the first element pointer 516 is set to the first element 504A in the array 502A. The first element pointer 516 provides an entry point into the linked list of arrays. From the operation 604, the routine 600 continues to operation 606.

At operation 606, the new element pointer 518 is set to the first element 504A in the array 502A. Because no PPIs have yet been added to the PEI PPI database, the location for the next new PPI is the first element 504A of the array 502. From operation 606, the routine 600 continues to operation 608, where the maximum element pointer 520 is set to the last element in the array 502A. For instance, in the example shown in FIG. 5, the maximum element pointer 520 would be set to the element 510A of the array 502A. As will be described in greater detail below with reference to FIG. 7, the new element pointer 518 is incremented each time a PPI is added to the PEI PPI database. When the new element pointer 518 and the maximum element pointer 520 have the same value, a new array is added to the linked list of arrays. From operation 608, the routine 600 continues to operation 610, where it ends.

Figure 7:
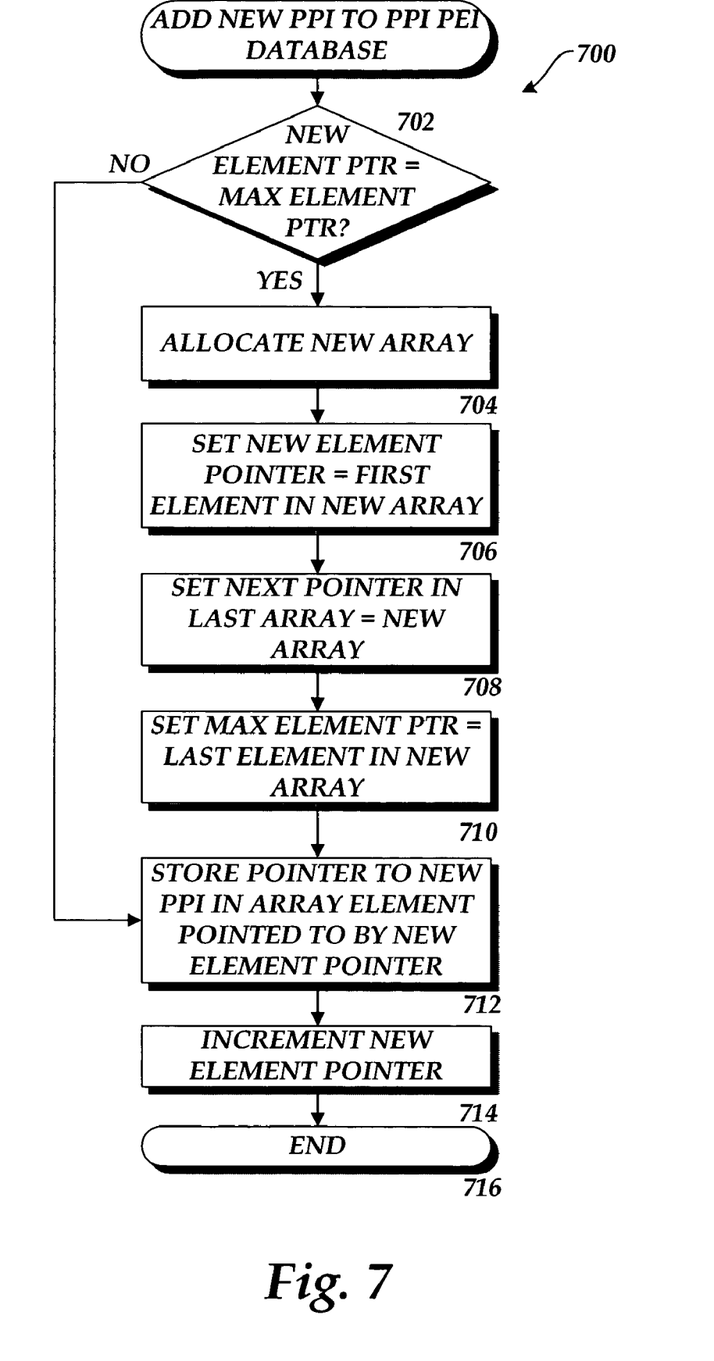

Referring now to FIG. 7, an illustrative routine 700 will be described for adding a new PPI to the PEI PPI database 500. The routine 700 may be utilized, for instance, by the service 410 to install a new PPI in the PEI PPI database 500. The routine 700 begins at operation 702, where a determination is made as to whether the new element pointer 518 and the maximum element pointer 520 point to the same element in the array. If not, the routine 700 branches from operation 702 to operation 712, described below. If they point to the same element, then a new array must be added to the linked list of arrays and the various pointers must be adjusted. Accordingly, in this case, the routine 700 continues from operation 702 to operation 704, where memory for a new array is allocated. Once the new array has been allocated, the routine 700 continues from operation 704 to operation 706 where the new element pointer 518 is set to the first element in the new array. From operation 706, the routine 700 continues to operation 708.

At operation 708, a pointer is created from the last array to the new array. This pointer is stored in the element 512A-512C for storing pointers to other arrays. Once the array has been added to the linked list through the creation of the pointer, the routine 700 continues from operation 708 to operation 710, where the maximum element pointer 520 is set to the last element in the new array for storing pointers to PPIs. The routine 700 then continues from operation 710 to operation 712, where the pointer to the new PPI is stored in the array element pointed to by the new element pointer 518. The routine 700 then continues to operation 714, where the new element pointer 518 is incremented to the next element. From operation 714, the routine 700 then continues to operation 716, where it ends.

Figure 8:
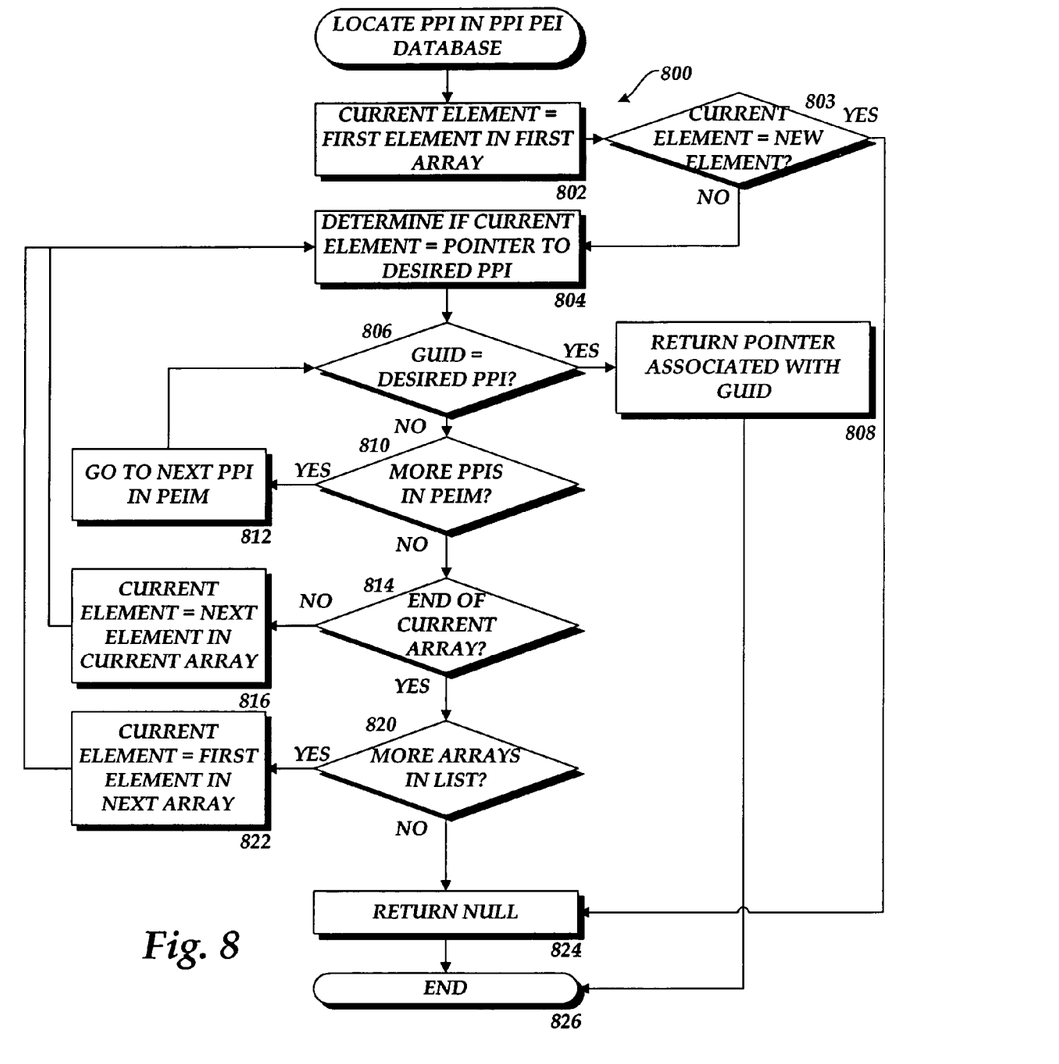

Turning now to FIG. 8, an illustrative routine 800 will be described for locating a PPI in the PPI PEI database 500. This routine may be utilized, for instance, by the service 414 for locating a PPI in the PEI PPI database 500 and by the service 412 for reinstalling a PPI in the PEI PPI database 500. The routine 800 begins at operation 802, where a temporary variable, called the 'current element' is set equal to the first element pointer 516. The current element variable references an array element in the linked list of arrays.

From operation 802, the routine 800 then continues to operation 803, where a determination is made as to whether the current element is equal to the new element pointer 518. If so, there are no PPIs in the database and the routine 800 branches from operation 803 to operation 824, described below. If the current element is not equal to the new element pointer 518, the routine 800 continues from operation 803 to operation 804, where a determination is made as to whether the current element variable points to an element that contains a reference to the desired PPI. This is accomplished by following the pointer in the array element pointed to by the current element variable to the referenced GUID/pointer pair. If the referenced GUID is the same as the GUID for the desired PPI, then the PPI has been located. Accordingly, at operation 806, the routine 800 branches to operation 808 if the current element contains the desired PPI. At operation 808, the pointer associated with the GUID is returned in response to the request to locate the PPI. From operation 808, the routine 800 continues to operation 826, where it ends.

If, at operation 806, it is determined that the current element does not contain a reference to the desired PPI, the routine 800 continues to operation 810. At operation 810, a determination is made as to whether additional GUID/pointer pairs remain to be checked in the PEIM referenced by the current element. If so, the routine 800 branches to operation 812, where the next GUID/pointer pair is considered. If no additional PPIs remain in the current PEIM, the routine 800 continues from operation 810 to operation 814. At operation 814, a determination is made as to whether the end of the current array has been reached. If so, the routine 800 branches to operation 816, where the current element variable is set to the next array element in the current array. If the end of the current array has been reached, the routine 800 continues to operation 820, where a determination is made as to whether additional arrays remain in the list to be searched for the desired PPI. If so, the routine 800 branches to operation 822 where the current element variable is set to the first element in the next array. From operations 812, 816, and 822, the routine 800 branches back to operation 804.

If, at operation 820, it is determined that no additional arrays remain in the linked list of arrays, the routine 800 continues to operation 824, where a null value is returned indicating that the desired PPI is not contained in the PEI PPI database. The routine 800 then continues to operation 826, where it ends.

It should also be appreciated that embodiments described herein provide methods, systems, apparatus, and computer-readable media for providing a PEI PPI database. Although the disclosure presented herein has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A computer-implemented method for storing data identifying a pre-extensible firmware interface initialization module (PEIM)-to-PEIM interface (PPI) in a pre-extensible firmware interface initialization environment, the method comprising performing computer-implemented operations for:
creating a PPI database for storing the data identifying the PPI, the PPI database comprising a linked list having two or more linked arrays of elements, wherein one or more of the elements of each array store data identifying a PPI including a pointer to a PPI descriptor for the PPI, wherein each array includes an element reserved for storing data identifying the last element in the array and an element reserved for storing a pointer to a next array in the linked list of arrays, wherein the PPI descriptor includes a globally unique identifier (GUID), a pointer to an interface provided by a corresponding PEIM, and one or more flags for indicating whether the PPI includes an additional GUID and pointer and whether a notification should be provided when the PPI is installed or reinstalled, wherein the PPI database is configured for use entirely in the pre-extensible firmware interface initialization environment prior to memory initialization.

2. A computer-implemented method for storing data identifying a pre-extensible firmware interface initialization module (PEIM)-to-PEIM interface (PPI) in a pre-extensible firmware interface initialization environment, the method comprising performing computer-implemented operations for:
creating a PPI database, the PPI database comprising a first array having one or more elements storing data identifying a PPI, an element storing an end indicator for identifying the last element in the array, and a next array element storing a pointer to a second array in the PPI database;
receiving a request to add a new PPI to the PPI database;
in response to the request to add a new PPI to the PPI database,
determining whether the first array is full,
storing data identifying the PPI in an element of the first array if the first array is not full, and
if the first array is full, creating the second array in the database, storing the data identifying the PPI in an element of the second array, and storing a pointer to the second array in the next array element of the first array;
wherein the data identifying the PPI comprises a pointer to a PPI descriptor, wherein the PPI descriptor comprises a globally unique identifier (GUID) and a pointer to an interface provided by a corresponding PEIM, wherein the PPI descriptor further comprises one or more flags for indicating whether the PPI includes an additional GUID and pointer, and wherein the flags are further operative to indicate whether a notification should be provided when the PPI is installed or reinstalled in the database.

3. A non-transitory computer storage medium having a data structure stored thereon, the data structure storing data identifying a pre-extensible firmware interface initialization module (PEIM)-to-PEIM interface (PPI) in a pre-extensible firmware interface initialization environment, the data structure comprising:
a first array having one or more elements storing data identifying a PPI, an element storing an end indicator for indicating the last element in the array, and a next array element storing a pointer to a next array in the linked list;
a second array having one or more elements storing data identifying a PPI, an element storing an end indicator for indicating the last element in the second array, and a next array element storing a pointer to a next array in the linked list, and wherein the next array element of the first array stores a pointer to the second array;
wherein the one or more elements storing data identifying a PPI store a pointer to a PPI descriptor contained in a PEIM, and wherein the PPI descriptor comprises a globally unique identifier (GUID), a pointer to an interface provided by a corresponding PEIM, one or more flags for indicating whether the PPI includes an additional GUID and pointer, and one or more flags indicating whether a notification should be provided when the PPI is installed or reinstalled.

* * * * *